(12) United States Patent
Kitaoka et al.

(10) Patent No.: US 11,982,998 B2
(45) Date of Patent: May 14, 2024

(54) MANUFACTURING MONITORING ASSISTANCE DEVICE, MANUFACTURING MONITORING ASSISTANCE METHOD, AND MANUFACTURING MONITORING ASSISTANCE PROGRAM

(71) Applicant: HITACHI, LTD., Tokyo (JP)

(72) Inventors: Masanori Kitaoka, Tokyo (JP); Hisashi Endou, Tokyo (JP); Nobuhiro Kakeno, Tokyo (JP); Hiroshi Yoshikawa, Tokyo (JP); Toshihiro Yamada, Tokyo (JP)

(73) Assignee: HITACHI, LTD., Tokyo (JP)

( * ) Notice: Subject to any disclaimer, the term of this patent is extended or adjusted under 35 U.S.C. 154(b) by 452 days.

(21) Appl. No.: 17/413,417

(22) PCT Filed: Jan. 30, 2020

(86) PCT No.: PCT/JP2020/003328
§ 371 (c)(1),
(2) Date: Jun. 11, 2021

(87) PCT Pub. No.: WO2020/166346
PCT Pub. Date: Aug. 20, 2020

(65) Prior Publication Data
US 2022/0057789 A1 Feb. 24, 2022

(30) Foreign Application Priority Data

Feb. 15, 2019 (JP) .................................. 2019-024966

(51) Int. Cl.
*G05B 19/418* (2006.01)
(52) U.S. Cl.
CPC . *G05B 19/41875* (2013.01); *G05B 19/41805* (2013.01); *G05B 19/4183* (2013.01); *G05B 19/41885* (2013.01)

(58) Field of Classification Search
CPC ........ G05B 19/41875; G05B 19/41805; G05B 19/4183; G05B 19/41885;
(Continued)

(56) References Cited

U.S. PATENT DOCUMENTS

| 2012/0039526 A1* | 2/2012 | Garaas | G08B 13/19641 382/154 |
| 2013/0226353 A1* | 8/2013 | Park | G05B 15/02 700/276 |

(Continued)

FOREIGN PATENT DOCUMENTS

| JP | 2006-346180 A | 12/2006 |
| JP | 2009-080514 A | 4/2009 |

(Continued)

OTHER PUBLICATIONS

José V. Abellan-Nebot, Jian Liu, F. Romero Subirón, Quality prediction and compensation in multi-station machining processes using sensor-based fixtures, Robotics and Computer-Integrated Manufacturing, vol. 28, Issue 2, 2012, pp. 208-219 (Year: 2012).*

(Continued)

*Primary Examiner* — Christopher E. Everett
(74) *Attorney, Agent, or Firm* — Volpe Koenig

(57) ABSTRACT

A manufacturing monitoring assistance device includes: a model creation unit creating a computation model when a product as a sample is normal, based on a three-dimensional form acquired from the product; a simulation unit creating a corrective computation model when the product is abnormal, by adding a sample of an abnormal portion in the product to the created computation model, and performing a simulation on each of the computation model and the corrective computation model; and a monitoring method determination unit determining a method for monitoring a manufacturing process for the product, based on an abnormality index being a difference between an output from a (Continued)

sensor as a result of the simulation performed on the computation model and an output from a sensor as a result of the simulation performed on the corrective computation model, and causing an output device to display the determined method and the abnormality index.

8 Claims, 10 Drawing Sheets

(58) Field of Classification Search
CPC ........... G05B 2219/37217; G05B 2219/37451; G05B 23/02; Y02P 90/02
See application file for complete search history.

(56) References Cited

U.S. PATENT DOCUMENTS

| | | | |
|---|---|---|---|
| 2013/0262068 A1* | 10/2013 | Israeli | F17D 5/02 703/9 |
| 2016/0098032 A1 | 4/2016 | Takahashi et al. | |
| 2018/0082204 A1 | 3/2018 | Iwamasa et al. | |

FOREIGN PATENT DOCUMENTS

| | | |
|---|---|---|
| JP | 2018-049390 A | 3/2018 |
| WO | 2015/008373 A1 | 1/2015 |

OTHER PUBLICATIONS

Shukla, N., Ceglarek, D. & Tiwari, M.K. Key characteristics-based sensor distribution in multi-station assembly processes. J Intell Manuf 26, 43-58 (2015). https://doi.org/10.1007/s10845-013-0759-5 (Year: 2015).*

K. He, M. Jia and C. Liu, "A Review of Optimal Sensor Deployment to Diagnose Manufacturing Systems," in IEEE Access, vol. 6, pp. 27418-27432, 2018, doi: 10.1109/ACCESS.2018.2834556. (Year: 2018).*

Zheng, Y., Yang, S. & Cheng, H. An application framework of digital twin and its case study. J Ambient Intell Human Comput 10, 1141-1153 (2019). https://doi.org/10.1007/s12652-018-0911-3 (Year: 2019).*

Rikard Söderberg, Kristina Wärmefjord, Johan S. Carlson, Lars Lindkvist, Toward a Digital Twin for real-time geometry assurance in individualized production, CIRP Annals, vol. 66, Issue 1, 2017, pp. 137-140 (Year: 2017).*

Villarraga Gómez, Herminso. (2016). Seeing is Believing: X-ray Computed Tomography for Quality Control. 55. 20-23. (Year: 2016).*

Nejatpour, R, Sadabad, AA, & Akbari, AA. "Automated Weld Defects Detection Using Image Processing and CAD Methods." Proceedings of the ASME 2008 Intl Mechanical Engineering Congress and Exposition. vol. 11: Mechanical Systems and Control. Boston, MA, USA. Oct. 31-Nov. 6, 2008. pp. 979-987. ASME (Year: 2008).*

International Search Report, PCT/JP2020/003328, dated Mar. 17, 2020 (4 pgs.).

* cited by examiner

FIG. 3

| SORT | ABNORMAL STATE | POSITION | WELDING CURRENT | HOLDING FORCE | DEGREE OF IMPORTANCE |
|---|---|---|---|---|---|
| SORT A | BLOWHOLE | #,#,# | # | # | 1.0 |
| | POOR FUSION | #,#,# | # | # | 0.8 |
| | POOR MERGE | #,#,# | # | # | 0.5 |
| | CRACK | #,#,# | # | # | 0.9 |
| | : | | | | |
| SORT B | BLOWHOLE | #,#,# | # | # | 0.9 |
| | POOR FUSION | #,#,# | # | # | 1.0 |
| | POOR MERGE | #,#,# | # | # | 0.8 |
| | CRACK | #,#,# | # | # | 0.5 |
| | : | | | | |
| SORT C | BLOWHOLE | #,#,# | # | # | 0.5 |
| | POOR FUSION | #,#,# | # | # | 0.9 |
| | POOR MERGE | #,#,# | # | # | 1.0 |
| | CRACK | #,#,# | # | # | 0.8 |
| | : | | | | |

FIG. 4

| SENSOR TYPE | MEASUREMENT VALUE | PLACEABLE POSITION | NUMBER OF USED SENSORS | COST |
|---|---|---|---|---|
| MAGNETIC SENSOR | MAGNETIC FIELD DISTRIBUTION | [#,#,#],[#,#,#],・・・ | # PIECES | # YEN/PIECE |
| STRAIN GAUGE | DEFORMATION OR STRAIN | [#,#,#],[#,#,#],・・・ | # PIECES | # YEN/PIECE |
| AMMETER | CURRENT DISTRIBUTION | [#,#,#],[#,#,#],・・・ | # PIECES | # YEN/PIECE |
| THERMOMETER | HEAT DISTRIBUTION | [#,#,#],[#,#,#],・・・ | # PIECES | # YEN/PIECE |
| : | | | | |

FIG. 5

| SORT | ABNORMAL STATE | SENSOR TYPE | VOXEL INFORMATION |
|---|---|---|---|
| SORT A | BLOWHOLE | MAGNETIC SENSOR | [T, V, S, ♭], [T, V, S, ♭], ··· |
| | | STRAIN GAUGE | [T, V, S, ♭], [T, V, S, ♭], ··· |
| | | AMMETER | [T, V, S, ♭], [T, V, S, ♭], ··· |
| | | THERMOMETER | [T, V, S, ♭], [T, V, S, ♭], ··· |
| | | ⋮ | |
| | POOR FUSION | MAGNETIC SENSOR | [T, V, S, ♭], [T, V, S, ♭], ··· |
| | | STRAIN GAUGE | [T, V, S, ♭], [T, V, S, ♭], ··· |
| | | AMMETER | [T, V, S, ♭], [T, V, S, ♭], ··· |
| | | THERMOMETER | [T, V, S, ♭], [T, V, S, ♭], ··· |
| | | ⋮ | |
| | POOR MERGE | MAGNETIC SENSOR | [T, V, S, ♭], [T, V, S, ♭], ··· |
| | | STRAIN GAUGE | [T, V, S, ♭], [T, V, S, ♭], ··· |
| | | AMMETER | [T, V, S, ♭], [T, V, S, ♭], ··· |
| | | THERMOMETER | [T, V, S, ♭], [T, V, S, ♭], ··· |
| | | ⋮ | |
| | CRACK | MAGNETIC SENSOR | [T, V, S, ♭], [T, V, S, ♭], ··· |
| | | STRAIN GAUGE | [T, V, S, ♭], [T, V, S, ♭], ··· |
| | | AMMETER | [T, V, S, ♭], [T, V, S, ♭], ··· |
| | | THERMOMETER | [T, V, S, ♭], [T, V, S, ♭], ··· |
| | | ⋮ | |
| | ⋮ | | |
| SORT B | BLOWHOLE | MAGNETIC SENSOR | [T, V, S, ♭], [T, V, S, ♭], ··· |
| | | STRAIN GAUGE | [T, V, S, ♭], [T, V, S, ♭], ··· |
| | | AMMETER | [T, V, S, ♭], [T, V, S, ♭], ··· |
| | | THERMOMETER | [T, V, S, ♭], [T, V, S, ♭], ··· |
| | | ⋮ | |
| | ⋮ | | |

Labels: 121 (SORT), 122 (ABNORMAL STATE), 123 (SENSOR TYPE), 124 (VOXEL INFORMATION), 125a, 125b, 33

FIG. 6

| SORT | SENSOR TYPE | VOXEL INFORMATION |
|---|---|---|
| SORT A | MAGNETIC SENSOR | [T, V, S, ♭], [T, V, S, ♭], ⋯ |
| | STRAIN GAUGE | [T, V, S, ♭], [T, V, S, ♭], ⋯ |
| | AMMETER | [T, V, S, ♭], [T, V, S, ♭], ⋯ |
| | THERMOMETER | [T, V, S, ♭], [T, V, S, ♭], ⋯ |
| | ⋮ | |
| SORT B | MAGNETIC SENSOR | [T, V, S, ♭], [T, V, S, ♭], ⋯ |
| | ⋮ | |

FIG. 7

START
↓
ACQUIRE FORM OF FINISHED PRODUCT — S201
↓
CREATE POLYGON DATA — S202
↓
CREATE COMPUTATION MODEL — S203
↓
PERFORM FIRST SIMULATION — S204
↓
CREATE ABNORMAL STATE SENSOR OUTPUT INFORMATION — S205
↓
PERFORM SECOND SIMULATION — S206
↓
CREATE NORMAL STATE SENSOR OUTPUT INFORMATION — S207
↓
CALCULATE DIFFERENCE BETWEEN SENSOR OUTPUTS — S208
↓
DETERMINE OPTIMUM SENSOR PLACEMENT — S209
↓
DETERMINE ABNORMALITY INDEX — S210
↓
DISPLAY SENSOR PLACEMENT AND ABNORMALITY INDEX — S211
↓
END

MANUFACTURING MONITORING ASSISTANCE DEVICE, MANUFACTURING MONITORING ASSISTANCE METHOD, AND MANUFACTURING MONITORING ASSISTANCE PROGRAM

CROSS REFERENCE TO RELATED APPLICATIONS

The present application is an application for US national entry of an international application No. PCT/JP2020/003328 filed on Jan. 30, 2020, and claims priority from Japanese patent application No. 2019-024966 filed on Feb. 15, 2019. The entirety of the contents and subject matter of all of the above is incorporated herein by reference.

TECHNICAL FIELD

The present invention relates to a manufacturing monitoring assistance device, a manufacturing monitoring assistance method, and a manufacturing monitoring assistance program.

BACKGROUND ART

For example, in constructing a new plant, members such as pipes are welded together for building structures. Welding is a manufacturing process of applying desired heat and/or force to a joint between members to melt the joint, and adding a filler material to the joint if necessary for hardening the joint, thereby joining the members into a continuous single member. Welding is an indispensable manufacturing process for mass products such as automobile parts, in addition to custom-made products such as plants.

Welding is a process at which various abnormalities occur due to variations in conditions such as a surface state of a member, holding force to be applied to two members, and welding current. In order to control welding quality, welding work is often monitored using sensors such as a camera, a pressure gauge, and an ammeter. In this case, the welding quality largely depends on selections as to what sensor is selected, where a used sensor is placed, what physical quantity is measured, and what index (e.g., a threshold value) is used for a determination on an abnormality. Such selections are appropriately made by much trial and error.

Actual members are used for the trial and error in some cases. Typically, computer simulations are performed for cost saving. Models for simulations are, for example, computation models of individual members and finished products created from design data. However, since welding is performed on-site under various conditions, an on-site weld form is often different from design data. As a result, a slight abnormality in a finished product (a difference from a normal product) is possibly overlooked.

PTL 1 discloses a characteristic value estimation device that creates a calculation model from sensor data and a probability distribution of uncertain parameters, and corrects the probability distribution of the uncertain parameters until a result of a simulation based on the computation model matches the sensor data.

CITATION LIST

Patent Literature

PTL 1: JP 2018-49390 A

SUMMARY OF INVENTION

Technical Problem

In the characteristic value estimation device disclosed in Patent Literature 1, the calculation model to be simulated is also based on design data. Accordingly, an actual form still largely differs from design data. Hence, an object of the present invention is to furnish, for example, a sensor position that contributes to detection of an abnormality in a product, in accordance with an actual form of the product.

Solution to Problem

A manufacturing monitoring assistance device according to the present invention includes: a model creation unit configured to create a computation model in a case where a product as a sample is normal, based on a three-dimensional form acquired from the product; a simulation unit configured to create a corrective computation model in a case where the product is abnormal, by adding a sample of an abnormal portion in the product to the created computation model, and to perform a simulation on each of the computation model and the corrective computation model; and a monitoring method determination unit configured to determine a method for monitoring a manufacturing process for the product, based on an abnormality index being a difference between an output from a sensor as a result of the simulation performed on the computation model and an output from a sensor as a result of the simulation performed on the corrective computation model, and to cause an output device to display the determined method and the abnormality index.

Other features will be described in an embodiment of the present invention.

Advantageous Effects of Invention

According to the present invention, it is possible to furnish, for example, a sensor position that contributes to detection of an abnormality in a product, in accordance with an actual form of the product.

BRIEF DESCRIPTION OF DRAWINGS

FIG. 3 illustrates abnormal state information.
FIG. 4 illustrates sensor information.
FIG. 5 illustrates abnormal state sensor output information.
FIG. 6 illustrates normal state sensor output information.
FIG. 7 is a flowchart of a processing procedure.

DESCRIPTION OF EMBODIMENTS

Figure 1:
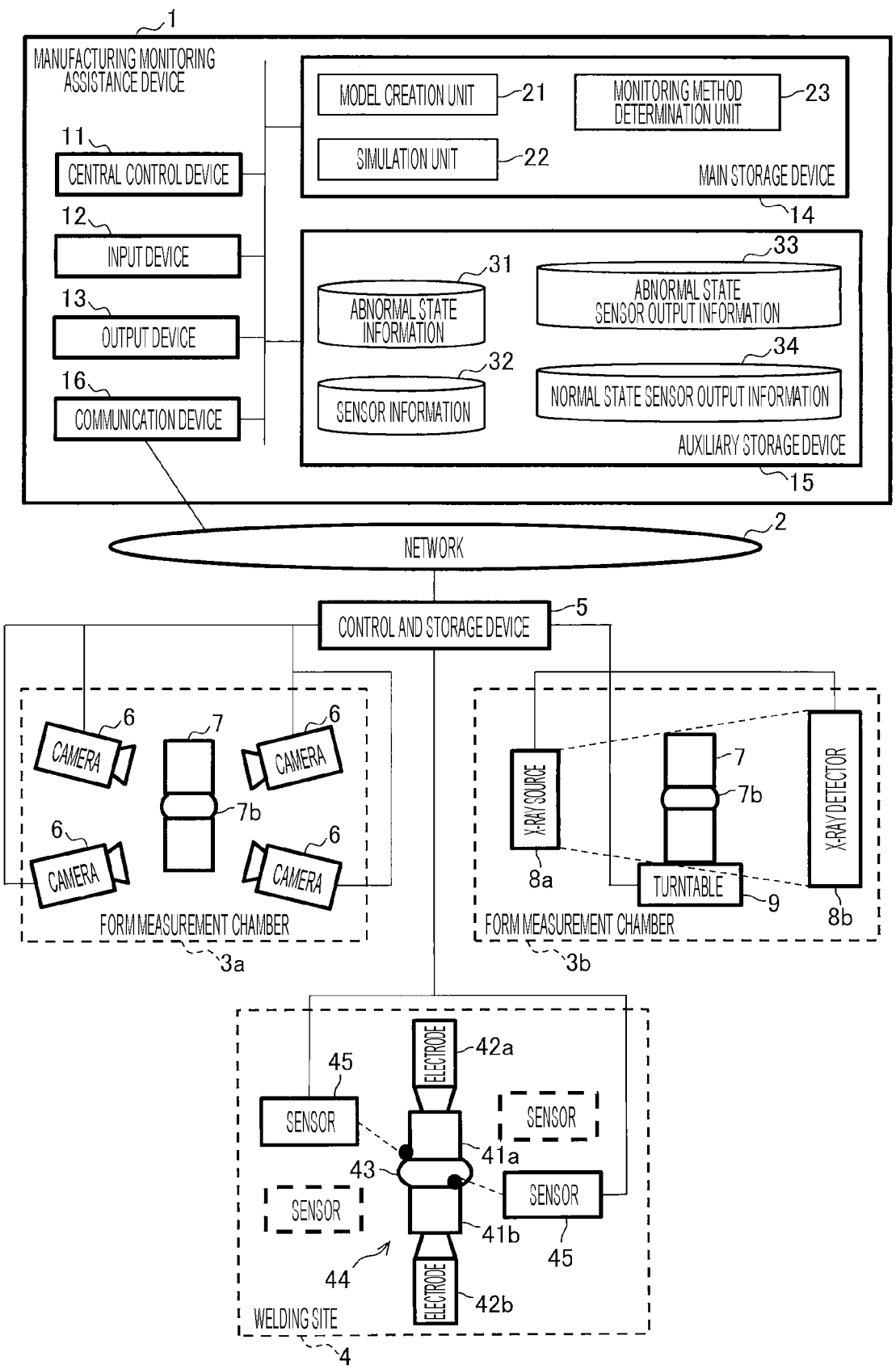
FIG. 1 illustrates, for example, a configuration of a manufacturing monitoring assistance device.

An embodiment of the present invention (hereinafter, referred to as "the present embodiment") will be described in detail below with reference to the drawings and others. The present embodiment is directed to exemplary welding of members such as pipes. The present invention may alternatively be applicable to other examples (e.g., bending, drilling, cutting, painting, adhesion other than welding, etc.) for processing a member while applying heat, force, or the like to the member.

(Configuration of Manufacturing Monitoring Assistance Device)

A description will be given of, for example, a configuration of a manufacturing monitoring assistance device 1 with reference to FIG. 1. The manufacturing monitoring assistance device 1 is a typical computer, and includes a central control device 11, an input device 12 such as a keyboard or a touch panel, an output device 13 such as a display, a main storage device 14, an auxiliary storage device 15, and a communication device 16. These devices are interconnected via a bus. The auxiliary storage device 15 stores abnormal state information 31, sensor information 32, abnormal state sensor output information 33, and normal state sensor output information 34 (each of which will be described in detail later).

The main storage device 14 includes a model creation unit 21, a simulation unit 22, and a monitoring method determination unit 23 each of which is a program. In the following, a "XX unit" described as an operating subject means that the central control device 11 reads the "XX unit" from the auxiliary storage device 15, loads the "XX unit" onto the main storage device 14, and executes processing to be described later.

The manufacturing monitoring assistance device 1 is capable of communicating with a control and storage device 5 via a wired or wireless network 2. The control and storage device 5 is connected to a sensor 45 placed in a welding site 4. The control and storage device 5 is also connected to a camera 6 placed in a form measurement chamber 3a. The control and storage device 5 is also connected to an X-ray source 8a, an X-ray detector 8b, and a turntable 9 placed in a form measurement chamber 3b.

(Form Measurement Chamber)

In the form measurement chamber 3a, four cameras 6 are placed around a finished product 7 (a sample of a product) including members welded together. The finished product 7 has a welded portion 7b that is raised to be slightly higher in height than the remaining portion. The cameras 6 acquire images of an outer form of the finished product 7, and transmit the acquired images to the control and storage device 5. The control and storage device 5 reconstructs a three-dimensional form of the finished product 7, based on the images received from the cameras 6.

In the form measurement chamber 3b, a finished product 7 is mounted on the turntable 9. The finished product 7 also has a welded portion 7b that is raised to be slightly higher in height than the remaining portion. The X-ray source 8a irradiates the finished product 7 with X-rays while the turntable 9 turns the finished product 7 360 degrees. The X-ray detector 8b detects X-rays passed through the finished product 7. The X-ray detector 8b transmits a detection image to the control and storage device 5. The turntable 9 transmits a rotation angle to the control and storage device 5. The control and storage device 5 reconstructs a three-dimensional form of the finished product 7, based on the detection image received from the X-ray detector 8b and the rotation angle received from the turntable 9. The X-ray source 8a, the X-ray detector 8b, and the turntable 9 each serve as a part of an X-ray computed tomography (CT) apparatus.

(Welding Site)

In the welding site 4, members 41a and 41b to be welded are stacked on top of each other between electrodes 42a and 42b. The electrodes 42a and 42b feed high-voltage current to the members 41a and 41b while applying large holding force to the members 41a and 41b (a welding process using resistance welding, as an example of a manufacturing process). The members 41a and 41b are welded together, so that an inspection target product 44 is obtained. The inspection target product 44 has a welded portion 43 that is raised to be slightly higher in height than its periphery.

In the welding site 4, one or more sensors 45 monitor the inspection target product 44. More specifically, the sensors 45 acquire given physical quantities on a surface of the inspection target product 44, inside the inspection target product 44, and in an external space near the inspection target product 44. The sensors 45 are of various types. The sensors 45 therefore acquire various physical quantities such as magnetism, current, temperature, and form (e.g., deformation, warpage). Measurement points (black points in FIG. 1) connected to the sensors 45 by broken lines are on the inspection target product 44, at which the sensors 45 measure the physical quantities.

The number of sensors 45 usable actually is specified due to cost constraints. The placement of the sensors 45 is also specified due to working space constraints. The positions of the sensors 45 correspond to the points on the inspection target product 44 at which the physical quantity is measured as described above. Therefore, when the positions of the sensors 45 are set, the measurement points are also set. Increasing the number of sensors 45 resulting in increasing the number of meaningless measurement points is waste of cost. Even in a case of using the same number of sensors, the cost is still wasted unless values measured by the respective sensors at the measurement points significantly indicate the quality (normal or abnormal) of the inspection target product 44. It is important to place the minimum number of sensors 45 at appropriate positions where the sensors 45 optimally detect a difference between a normal state and an abnormal state.

The manufacturing monitoring assistance device 1 according to the present embodiment virtually simulates the placement of sensors in the welding site 4 where the restrictions described above are imposed, without the use of the actual welding site 4. The manufacturing monitoring assistance device 1 gives a result of the simulation to a user, and provides feedback to the welding site 4 via the control and storage device 5 if necessary.

The finished product 7 and the inspection target product 44 have the same shape, size and material. In the present embodiment, the two products are called separately for ease of the description. Specifically, the "finished product" refers to a product sample for creating a computation model for a simulation (to be described in detail later). On the other hand, the "inspection target product" refers to a product to be simulated and a product to be monitored by the sensors 45 in the actual welding site. As will described in detail later, it is assumed that the finished product is a "normal product" successfully subjected to welding.

It can be said that the sensors involve the cameras 6 in the form measurement chamber 3a and the X-ray detector 8b in the form measurement chamber 3b. In the present embodiment, however, the sensors 45 for monitoring do not involve, for example, the cameras 6 for creating a computation model, for simplification of the description.

FIG. 1 illustrates exemplary pressure welding (resistance welding) in the welding site 4. Any welding may alternatively be performed. In the case of, for example, fusion welding (e.g., arc welding), one of the electrodes, that is, the electrode 42a is connected to a torch gripped by a worker or a working robot (not illustrated).

(Functions of Model Creation Unit and the Like)

For ease of understanding of the present invention, first, a description will be given of schematic functions of the model creation unit 21, simulation unit 22, and monitoring method determination unit 23.

The model creation unit 21 acquires images of the finished product from the cameras 6, the X-ray detector 8b, and the like. The model creation unit 21 may acquire images from other devices rather than the cameras 6, the X-ray detector 8b, and the like. Examples of "other devices" may include three-dimensional laser scanners and the like. In any case, the present invention has a feature in that the model creation unit 21 acquires stipple data, voxel data, or the like obtained by capturing images of an actual finished product, rather than design data.

The model creation unit 21 converts stipple data, voxel data, or the like into a computation model as a solid model. The solid model refers to a sold model which is not hollow (papier). In the present embodiment, the mathematical entity of a computation model is a set of inequalities expressed by three variables (X, Y, and Z) capable of recognizing a surface position, a surface shape, and an inner region of an inspection target product. It is assumed herein that a finished product is normal. The computation model therefore indicates a normal product.

The simulation unit 22 adds abnormal state information that is separately prepared in advance to the computation model to generate a "corrective computation model". The abnormal state information refers to, for example, a sample of an abnormality, that is, information indicating that what kind of defect (e.g., blowhole, crack, etc.) has occurred at which portion of an inspection target product.

The simulation unit 22 applies typical physical simulation software to both the computation model and the corrective computation model to perform a simulation. The simulation refers to a computational experiment for simulating that "which portion of an inspection target product indicated by a (corrective) computation model causes what kind of reaction when what kind of external factor (e.g., heat, force, electricity, magnetism, etc.) is applied to the inspection target product".

Figure 2:
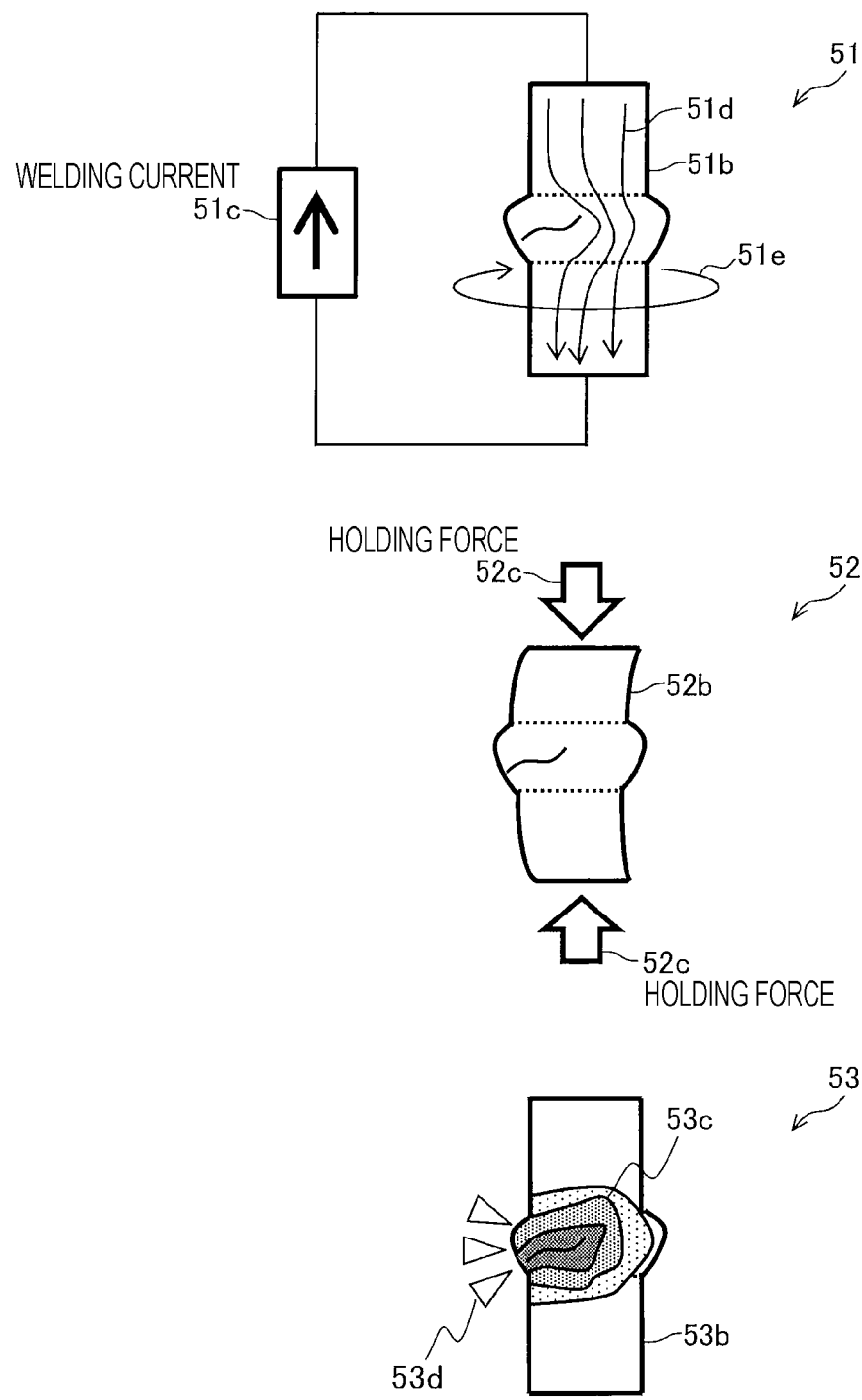
FIG. 2 illustrates an exemplary simulation.

FIG. 2 illustrates an exemplary simulation. Specifically, FIG. 2 illustrates exemplary electromagnetic computation 51. The simulation unit 22 applies a welding current 51c to a corrective computation model 51b to acquire a current distribution 51d in a certain portion of the corrective computation model and a magnetic field distribution 51e in a certain space near the corrective computation model. FIG. 2 also illustrates exemplary structural computation 52. The simulation unit 22 applies a holding force 52c to a corrective computation model 52b to acquire a deformation and a strain at a certain portion of the corrective computation model. FIG. 2 also illustrates exemplary heat and light propagation computation 53. The simulation unit 22 applies heat or light to a corrective computation model 53b to acquire heat (a temperature) 53c and light (a luminosity) 53d at a certain portion of the corrective computation model.

The simulation unit 22 creates normal state sensor output information as a result of the application of the physical simulation software to the computation model. The simulation unit 22 creates abnormal state sensor output information as a result of the application of the similar physical simulation software to the corrective computation model. For example, in a case where the abnormal state information indicates a "crack" at a welded portion, a corrective computation model is obtained by deleting a space corresponding to the "crack" portion from a computation model (i.e., by making a computation model hollow). Applying force or the like to the corrective computation model on the simulation will cause a difference (unnatural deformation, breakage, etc.) as compared with applying the same force or the like to the computation model.

The monitoring method determination unit 23 calculates a difference between the abnormal state sensor output information and the normal state sensor output information as to the same inspection target product. The difference changes depending on the type and position of each sensor 45. Therefore, the monitoring method determination unit 23 calculates the difference while variously changing the abnormal state and the type and position of each sensor. The monitoring method determination unit 23 determines, for each sensor type, a difference and a sensor position that attain the maximum value of subtraction of a sensor-related cost from the difference, and displays the difference and sensor type thus determined. In other words, the monitoring method determination unit 23 determines, for each abnormal state and for each sensor type, a sensor position at which a difference between a normal state and an abnormal state increases even though the cost is low, and displays the sensor position thus determined.

(Abnormal State Information)

FIG. 3 illustrates the abnormal state information 31. The abnormal state information 31 contains sorts stored in a sort field 101, abnormal states stored in an abnormal state field 102, positions stored in a position field 103, welding currents stored in a welding current field 104, holding forces stored in a holding force field 105, and degrees of importance stored in a degree-of-importance field 106. The abnormal states, the positions, the welding currents, the holding forces, and the degrees of importance are associated with the sorts.

The sorts in the sort field 101 each refer to a type of a finished product. For example, "sort A" indicates "a finished product obtained by welding two steel pipes together in series, the pipes each having a thickness of X cm, a length of X cm, and an outer diameter of X cm".

The abnormal states in the abnormal state field 102 each refer to a pattern of an abnormal welding result that actually occurred in the past. Examples of the abnormal states may include "blowhole", "poor fusion", "poor merge", "crack", and the like. Any abnormal state may alternatively be stored in the abnormal state field 102.

The positions in the position field 103 each refer to a three-dimensional coordinate value indicating a position of an abnormal state occurring at a finished product. An abnormal state may occur at a surface of a finished product or may occur inside a finished product. The abnormal state may occur in the form of a point. In addition, the abnormal state may occur in the form of a line, a plane, or a space. In this case, the position field 103 stores an equation expressed by three variables (X, Y, X) defining the line or the like. In the position field 103, "#" indicates a different value in an abbreviated manner (the same applies to the other fields and the other figures). The origin of a coordinate space is set optionally.

The welding currents in the welding current field 104 each refer to a current value of welding current applied between two members or between one of the members and a torch.

The holding forces in the holding force field 105 each refer to a force (a pressure) applied between two members to be welded in resistance welding.

The degrees of importance in the degree-of-importance field 106 each refer to a value indicating the importance of an abnormal state. An abnormal state with a higher degree of importance requires much attention to the corresponding sort.

The abnormal state information 31 contains abnormal samples that occurred at finished products in the past. For example, the record on the first row indicates a fact that "blowhole occurred at position [#, #, #] when holding force # and welding current # are applied to sort A". In other words, the welding current and the holding force correspond to conditions on which an abnormal state occurs (abnormality occurrence conditions).
(Sensor Information)

FIG. 4 illustrates the sensor information 32. The sensor information 32 contains sensor types stored in a sensor type field 111, measurement values stored in a measurement value field 112, placeable positions stored in a placeable position field 113, numbers of used sensors stored in a used number field 114, and costs stored in a cost field 115. The measurement values, the placeable positions, the numbers of used sensors, and the costs are associated with the sensor types.

The sensor types in the sensor type field 111 each refer to a type of a sensor. A sensor is of any type capable of measuring a given physical quantity of the inspection target product 44 in the welding site 4 (FIG. 1). The sensor types also refer to a type of a sensor usable for a simulation.

The measurement values in the measurement value field 112 each refer to a characteristic (a physical quantity) of an inspection target product indicated by a value measured by a sensor.

The placeable positions in the placeable position field 113 each refer to a three-dimensional coordinate value of a position where each sensor 45 is placeable in the welding site 4. There are multiple placeable positions each of which may be defined as a line, a plane, or a space. In measuring a physical quantity of a contact portion of the inspection target product 44 with each sensor 45, a placeable position indicates a certain position on a surface of the inspection target product.

The numbers of used sensors in the used number field 114 each refer to a maximum value of the number of sensors to be used at the same time. The number of used sensors is equal to the number of placeable positions.

The costs in the cost field 115 each refer to a price of one sensor.
(Abnormal State Sensor Output Information)

FIG. 5 illustrates the abnormal state sensor output information 33. The abnormal state sensor output information 33 contains sorts stored in a sort field 121, abnormal states stored in an abnormal state field 122, sensor types stored in a sensor type field 123, and voxel information items stored in a voxel information field 124. The abnormal states, the sensor types, and the voxel information items are associated with the sorts.

The sorts in the sort field 121 are equal to the sorts illustrated in FIG. 3.

The abnormal states in the abnormal state field 122 are equal to the abnormal states illustrated in FIG. 3.

The sensor types in the sensor type field 123 are equal to the sensor types illustrated in FIG. 4. In FIG. 5, at least four sensor types are associated with one abnormal state. The sensor types to be associated with each abnormal state are equal to one another. In practice, however, each abnormal state is not necessarily associated with at least four sensor types. For example, a user may preset sensor types "strain gauge" and "ammeter" for an abnormal state "blowhole". In this setting, records 125a and 125b are associated with "blowhole" in "sort A". The relationship between an abnormal state and a sensor type set by the user is also called a "practically limited relationship".

The voxel information items in the voxel information field 124 each refer to time-series measurement values obtained by sensors at different positions in a three-dimensional space. Each voxel information item involves multiple sets of "[T, V, S, ♭]". In each set, "T" represents a time. Also in each set, "V" represents a three-dimensional vector indicating a position (X, Y, Z) of a voxel. Also in each set, "S" represents a sensor placement corresponding to a combination of selected two, three, . . . , or m placeable positions from among n placeable positions (m≤n) as to a certain sensor (the details will be described later). Also in each set, "♭" represents a measurement value obtained by a sensor.
(Normal State Sensor Output Information)

FIG. 6 illustrates the normal state sensor output information 34. The normal state sensor output information 34 contains sorts stored in a sort field 131, sensor types stored in a sensor type field 132, and voxel information items stored in a voxel information field 133. The sensor types and the voxel information items are associated with the sorts.

As will be clear from a comparison between FIG. 5 and FIG. 6, the configuration of the normal state sensor output information 34 (FIG. 6) corresponds to the configuration of the abnormal state sensor output information 33 (FIG. 5) from which the abnormal state field 122 is deleted. The abnormal state field 122 is unnecessary since the normal state sensor output information 34 illustrated in FIG. 6 is premised on a finished product that is normal. The respective fields in FIG. 6 are not described here since they are equal to those in FIG. 5. However, the voxel information items in FIG. 6 each refer to a result of a simulation performed on a computation model indicating a normal product.
(Processing Procedure)

FIG. 7 is a flowchart of a processing procedure. A description will be given of the processing procedure in FIG. 7 with reference to FIGS. 8, 10, and 12 as appropriate. In the following description, for simplification of the description, the manufacturing monitoring assistance device 1 executes the processing procedure on a certain sort (e.g., "sort A").

In step S201, the model creation unit 21 of the manufacturing monitoring assistance device 1 acquires a form of a finished product. Specifically, the model creation unit 21 acquires the three-dimensional form data of the finished product 7 from the control and storage device 5. It is assumed herein that the control and storage device 5 stores form data of the finished product acquired from the cameras 6, the X-ray detector 8b, and the like in advance. The form data to be acquired by the model creation unit 21 is three-dimensional stipple data 61 (FIG. 8) or voxel data (not illustrated).

Figure 8:
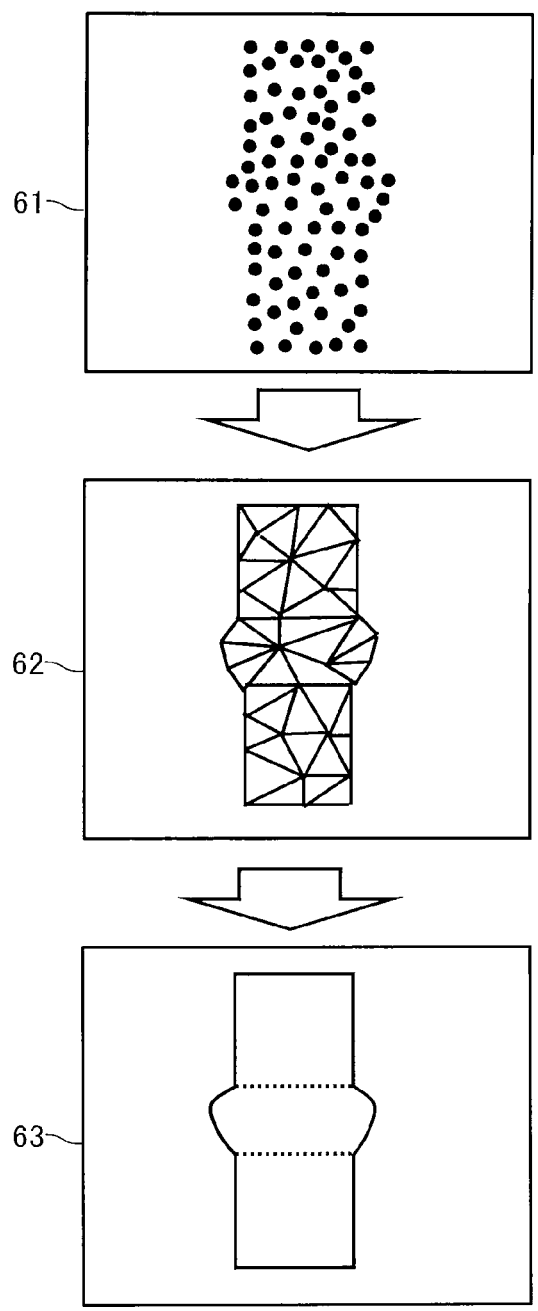
FIG. 8 illustrates a method of creating a computation model.

In step S202, the model creation unit 21 creates polygon data 62 (FIG. 8). Specifically, the model creation unit 21 creates polygon data from stipple data or voxel data in accordance with Method 1 or Method 2 below.
<Method 1>

In a case where the form data acquired in step S201 is the stipple data acquired from the cameras, the model creation unit 21 creates the polygon data by connecting gauged points with line segments (sides). At this time, the model creation unit 21 may delete a gauged point that possibly indicates an outlier (noise) or may interpolate a gauged point that is possibly redundant. In addition, the model creation unit 21 may set a predetermined threshold value or more for a length of a side between two gauged points. The gauged points are depicted points, which are different in concept from the measurement points (the black points in FIG. 1).
<Method 2>

In a case where the form data acquired in step S201 is the voxel data acquired from the X-ray CT apparatus, the model creation unit 21 distinguishes between the inside of the finished product and the outside of the finished product, based on a density distribution of each voxel to calculate a surface position of the finished product. The model creation unit 21 creates polygon data by dividing a space defined by the surface position into polygons.

In step S203, the model creation unit 21 creates a computation model. Specifically, the model creation unit 21 creates a computation model 63 (FIG. 8) as a solid model by detecting regions approximating to planes, columns, cones, and the like from the polygon data created in step S202 and creating a curved form of the surface for each region.

In step S204, the simulation unit 22 of the manufacturing monitoring assistance device 1 performs a first simulation. Next, a description will be given with reference to FIG. 9 rather than FIG. 7; however, the manufacturing monitoring assistance device 1 continuously executes the processing procedure.

(Details of step S204)

Figure 9:
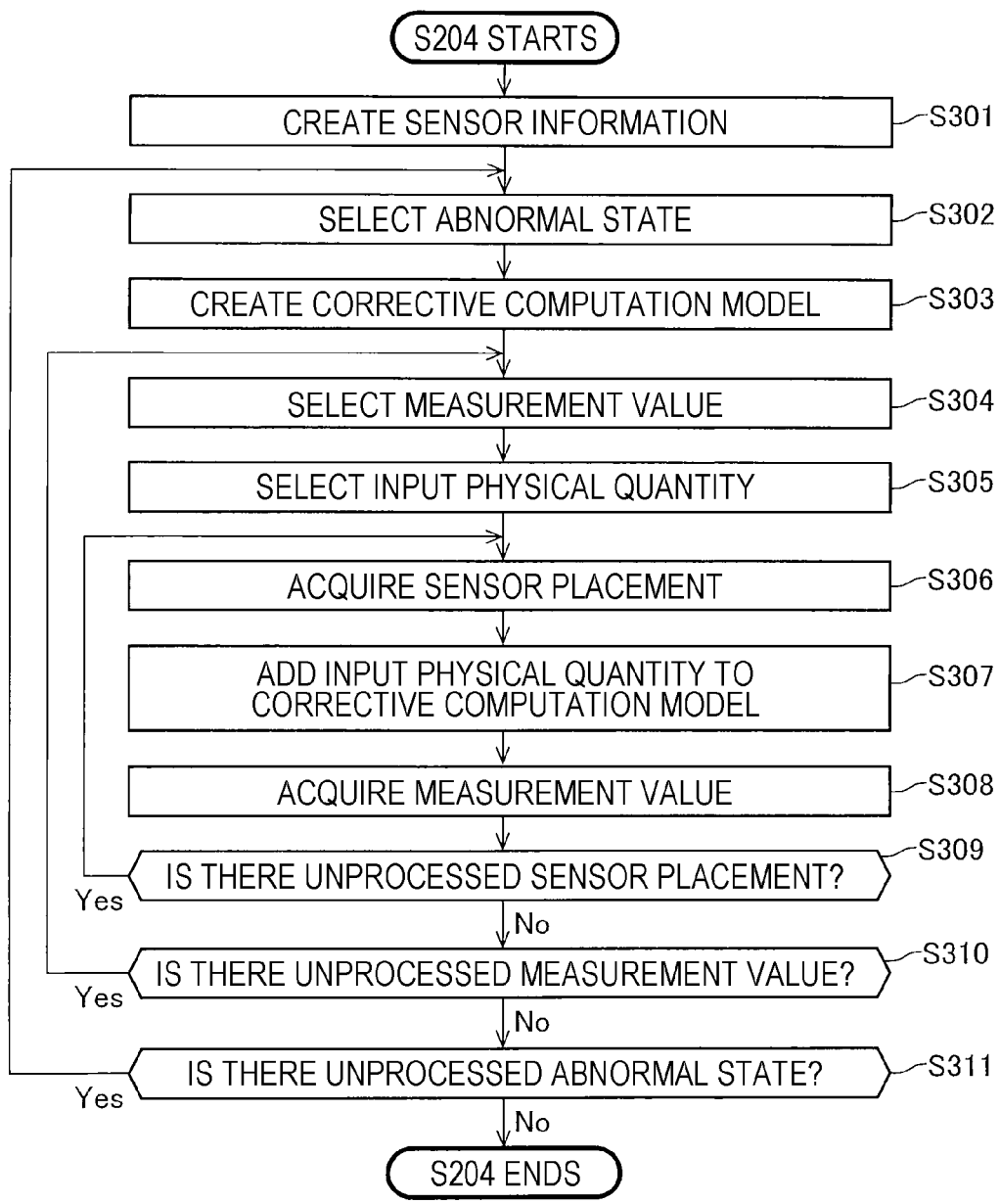
FIG. 9 is a specific flowchart of step S204 in the processing procedure.

FIG. 9 is a specific flowchart of step S204 in the processing procedure.

In step S301, the simulation unit 22 of the manufacturing monitoring assistance device 1 creates sensor information 32 (FIG. 4). Specifically, first, the simulation unit 22 causes the output device 13 to display the sensor information 32. In the sensor information 32, all the fields are blank.

Second, the simulation unit 22 accepts data entries by the user to the fields on the rows in the sensor information 32.

In step S302, the simulation unit 22 selects an abnormal state. Specifically, first, the simulation unit 22 causes the output device 13 to display abnormal state information 31 (FIG. 3). In the abnormal state information 31, all the fields are blank.

Second, the simulation unit 22 accepts data entries by the user to the fields on the rows in the abnormal state information 31.

Third, the simulation unit 22 extracts, from the abnormal state information 31, records associated with the sort of the inspection target product. The simulation unit 22 then acquires an unprocessed given one of the extracted records. The record thus acquired is also called a "target abnormal state record".

In step S303, the simulation unit 22 creates a corrective computation model. Specifically, in accordance with Method 11 or Method 12 below, the simulation unit 22 processes the computation model created in step S203, using the information on an abnormal state (the field 102) and information on a position (the field 103) in the target abnormal state record.
<Method 11>

Figure 10:
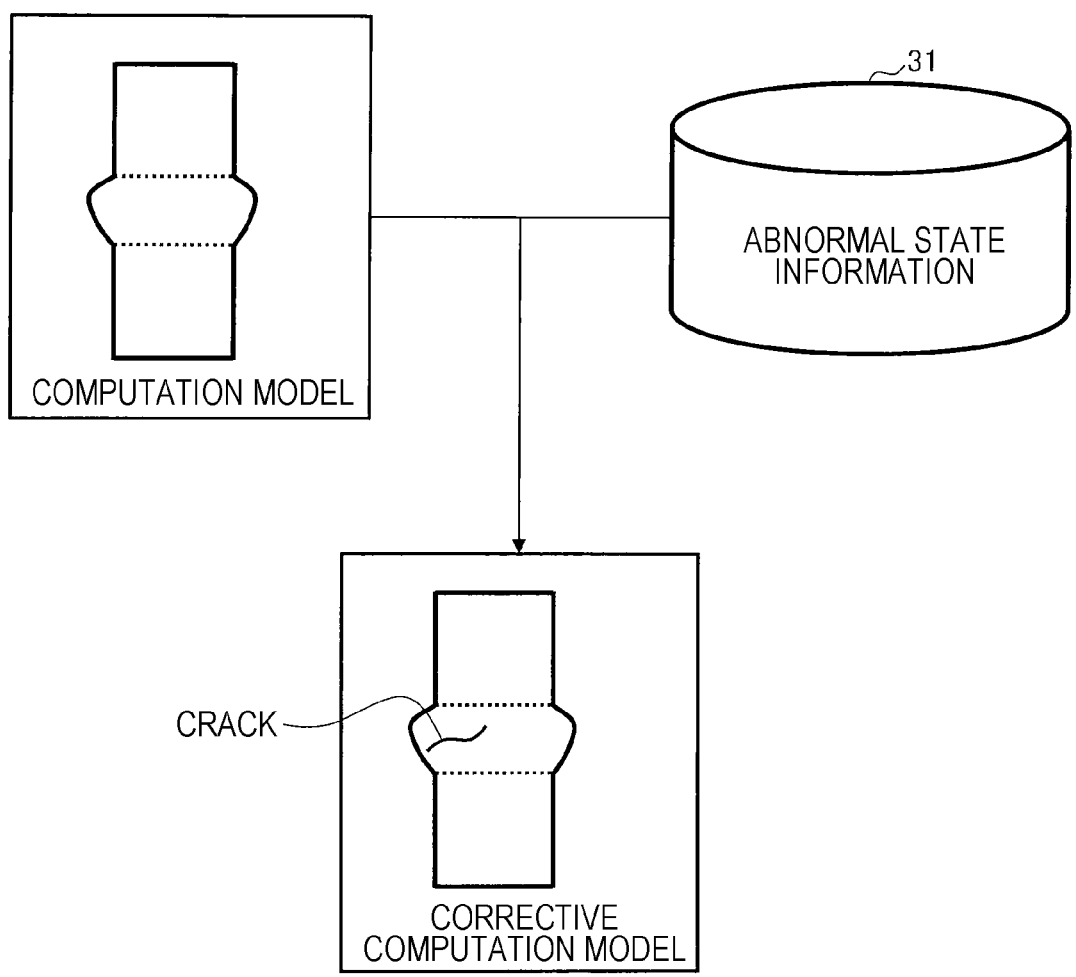
FIG. 10 illustrates a method of creating a corrective computation model.

The simulation unit 22 deletes a space corresponding to "blowhole" or "crack" from the computation model. FIG. 10 illustrates a method of creating the corrective computation model (particularly a method of deleting the space corresponding to "crack").
<Method 12>

The simulation unit 22 deletes or adds a space corresponding to "poor fusion" or "poor merge" from or to the computation model. In other words, the simulation unit 22 expresses a state in which the welded portion is recessed or raised with respect to its periphery.

For ease of the description, it is assumed herein that the target abnormal state record is the record on the first row in FIG. 3. In this case, the simulation unit 22 adopts Method 11.

In step S304, the simulation unit 22 selects a measurement value. Specifically, the simulation unit 22 extracts, from the records in the sensor information 32 (FIG. 4), records of which the sensor types are in a practically limited relationship with the abnormal state of the target abnormal state record, and acquires an unprocessed given one of the extracted records. The record thus acquired is also called a "target sensor record". For ease of the description, it is assumed herein that the target sensor record is the record on the first row in FIG. 4. The simulation unit 22 selects the measurement value ("magnetic field distribution" in this example) of the target sensor record unless otherwise instructed by the user. The simulation unit 22 acquires the corresponding "magnetic sensor" as the sensor type for measuring the magnetic field distribution.

The sensor type indicates a type of a sensor to be virtually used by physical simulation software and to be actually used by the user in the welding site 4 (FIG. 1). Likewise, the measurement value indicates a measurement value to be virtually output by the physical simulation software and to be actually measured by the sensor in the welding site 4.

In step S305, the simulation unit 22 selects an input physical quantity. Typically, the physical simulation software applies a given physical quantity (e.g., force, current, heat, etc.) to a given portion of a computation model (or a corrective computation model), and acquires the same physical quantity or a different physical quantity from another given portion of the computation model. The "input physical quantity" refers to a physical quantity to be applied to the computation model (or the corrective computation model).

Specifically, the simulation unit 22 causes the output device 13 to display a message "Specify input physical quantity". The simulation unit 22 accepts entries of two input physical quantities by the user. The simulation unit 22 regards the physical quantities ("welding current" and "holding force" in this example) stored in the fields 104 and 105 of the target abnormal state record, as being specified as the input physical quantities unless the user specifies the input physical quantities.

In step S306, the simulation unit 22 acquires a sensor placement. The sensor placement refers to a combination of multiple positions where sensors are placed. It is assumed in the target sensor record that the number of placeable positions (the field 113) is n and the number of used sensors (the field 114) is m (m≤n). In this case, the sensor placement is a combination of selected two, three, . . . , or m sensors from among the n placeable positions. The total number of candidates for the sensor placement is expressed by "$_nC_2+_nC_3+ \ldots +_nC_m$". The simulation unit 22 acquires an unprocessed given one of the candidates, the number of which is expressed by "$_nC_2+_nC_3+ \ldots +_nC_m$", for the sensor placement. The sensor placement thus acquired is also called a "target sensor placement".

In step S307, the simulation unit 22 adds the input physical quantity to the corrective computation model. Specifically, first, the simulation unit 22 divides the corrective computation model as the solid model into three-dimensional voxels having granularity visible by the user. At this time, the simulation unit 22 divides a portion, which may include at least an abnormal state, of the inspection target product into voxels. In addition, the simulation unit 22 may divide the inspection target product including a predetermined outer portion distant from the surface of the inspection target product, into the three-dimensional voxels in order to simulate heat dissipation, magnetic fields, and the like in the air.

Second, the simulation unit 22 adds the input physical quantity selected in step S305 to a predetermined portion of the corrective computation model, and continuously adds the input physical quantity thereafter. The physical simulation software (not illustrated) virtually simulates and outputs a time-series measurement value for each three-dimensional voxel.

In step S308, the simulation unit 22 acquires a measurement value. Specifically, the simulation unit 22 acquires measurement values for each divided voxel in a time-series manner from the sensors of the sensor type acquired in step S304, the sensors being placed based on the sensor placement acquired in step S306. The measurement values acquired at this time are results of calculation by the physical simulation software, and are each represented by "[T, V, S, ├]" illustrated in FIG. 5.

In step S309, the simulation unit 22 determines whether there is an unprocessed sensor placement. Specifically, when the simulation unit 22 determines that there is an unprocessed target sensor placement ("Yes" in step S309), the processing procedure returns to step S306. When the simulation unit 22 determines that there is no unprocessed target sensor placement ("No" in step S309), the processing procedure proceeds to step S310.

In step S310, the simulation unit 22 determines whether there is an unprocessed measurement value. Specifically, when the simulation unit 22 determines that there is an unprocessed target sensor record ("Yes" in step S310), the processing procedure returns to step S304. When the simulation unit 22 determines that there is no unprocessed target sensor record ("No" in step S310), the processing procedure proceeds to step S311.

In step S311, the simulation unit 22 determines whether there is an unprocessed abnormal state. Specifically, when the simulation unit 22 determines that there is an unprocessed target abnormal state record ("Yes" in step S311), the processing procedure returns to step S302. When the simulation unit 22 determines that there is no unprocessed target abnormal state record ("No" in step S311), step S204 ends, and the processing procedure proceeds to step S205 (FIG. 7).

After all, each time step S308 is carried out, the simulation unit 22 acquires measurement values for each voxel in a time-series manner in accordance with a certain abnormal state, a certain measurement value (a sensor type), and a certain sensor placement. At the end of the loop from steps S302 to S311, the simulation unit 22 acquires information for creating the abnormal state sensor output information 33 (FIG. 5).

Referring back to FIG. 7, in step S205, the simulation unit 22 creates abnormal state sensor output information 33 (FIG. 5). Specifically, the simulation unit 22 stores the data acquired in step S308 in the voxel information field 124 of the abnormal state sensor output information 33.

In step S206, the simulation unit 22 performs a second simulation. Next, a description will be given with reference to FIG. 11 rather than FIG. 7; however, the manufacturing monitoring assistance device 1 continuously executes the processing procedure.

(Details of Step S206)

Figure 11:
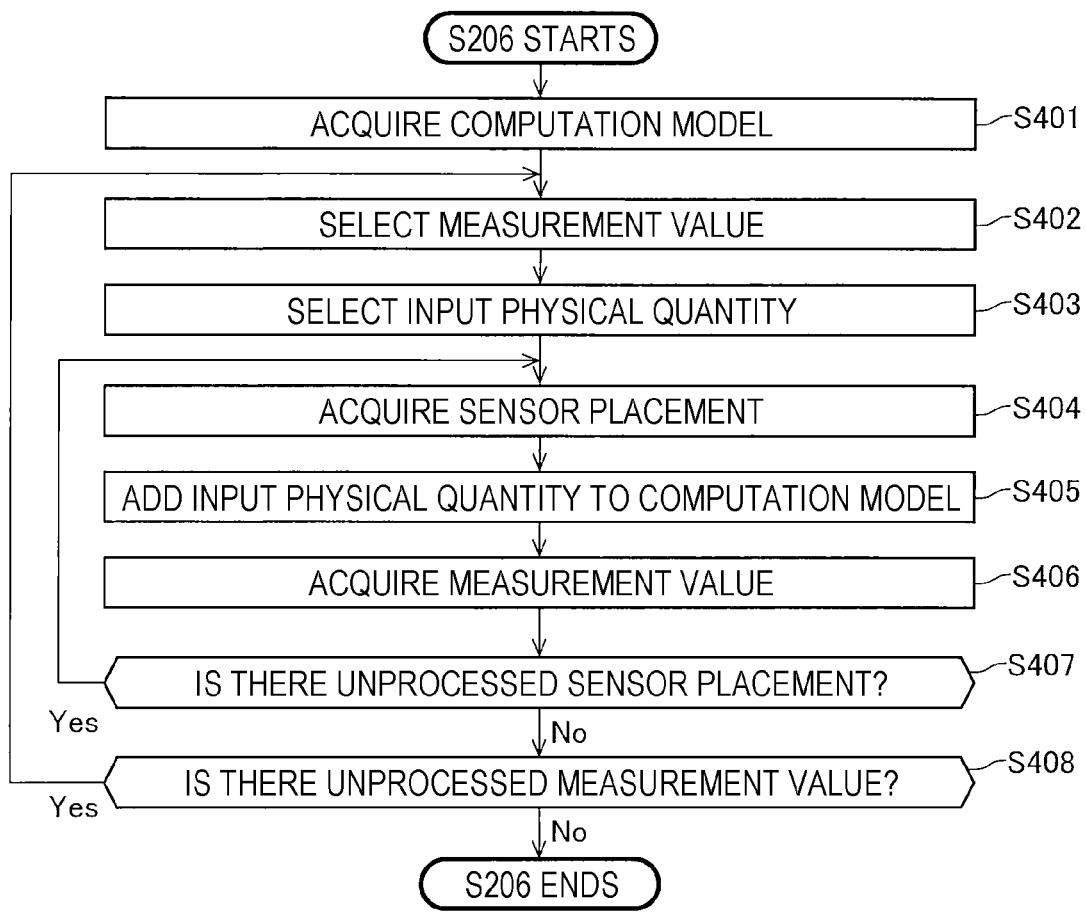
FIG. 11 is a specific flowchart of step S206 in the processing procedure.

FIG. 11 is a specific flowchart of step S206 in the processing procedure.

In step S401, the simulation unit 22 of the manufacturing monitoring assistance device 1 acquires a computation model. Specifically, the simulation unit 22 acquires the computation model created in step S203.

The processes from steps S402 to S408 are similar to those from steps S304 to S310 in FIG. 9. In the processes from steps S402 to S408 in FIG. 11, the computation model is used in place of the corrective computation model. In addition, the processes from steps S402 to S408 in FIG. 11 correspond to the processes in FIG. 9 from which the "outer loop" for selecting abnormal states and creating a corrective computation model for each abnormal state is deleted. In the processes from steps S402 to S408, the simulation unit 22 does not perform the processes for sensor types that are in the practically limited relationship with none of the abnormal states. When the simulation unit 22 determines that there is no unprocessed measurement value ("No" in step S408), step S206 ends, and the processing procedure proceeds to step S207 (FIG. 7).

After all, each time step S406 is carried out, the simulation unit 22 acquires measurement values for each voxel in a time-series manner in accordance with a certain measurement value (a sensor type) and a certain sensor placement, with regard to a normal product. At the end of the loop from steps S402 to S408, the simulation unit 22 acquires information for creating the normal state sensor output information 34 (FIG. 6).

Referring back to FIG. 7, in step S207, the simulation unit 22 creates normal state sensor output information 34 (FIG. 6). Specifically, the simulation unit 22 stores the data acquired in step S406 in the voxel information field 133 of the normal state sensor output information 34. At this time, the simulation unit 22 stores, for example, "sort A" in the sort field 131, and stores the sensor type in the sensor type field 132. However, the simulation unit 22 does not create records of sensor types that are in the practically limited relationship with none of the abnormal states.

Next, a description will be given of processes to be performed by the monitoring method determination unit 23 of the manufacturing monitoring assistance device 1. For simplification of the description on mathematical expressions, the description on the processes from steps S208 to S210 does not mention the loop for each sensor type. However, the monitoring method determination unit 23 repeatedly performs the processes from steps S208 to S210 on all the sensor types (i.e., all the measurement values).

In step S208, the monitoring method determination unit 23 of the manufacturing monitoring assistance device 1 calculates a difference between sensor outputs. Specifically, the monitoring method determination unit 23 calculates a difference $D_{ik}$ represented by Equation 1, based on the degree of importance in the abnormal state information 31 (FIG. 3), the voxel information in the abnormal state sensor output information 33 (FIG. 5), and the voxel information in the normal state sensor output information 34 (FIG. 6).

[Mathematical Formula 1]

$$D_{ik} = w_i \max_t |E_{ik}(t) - N_k(t)| \qquad (1)$$

In Equation 1, "E" represents a measurement value (corresponding to "├" in FIG. 5) of the voxel information in the abnormal state sensor output information 33. Also in Equation 1, "N" represents a measurement value (corresponding to "├" in FIG. 6) of the voxel information in the normal state sensor output information 34. Also in Equation 1, "t" represents a time (corresponding to "T" in FIGS. 5 and 6).

Also in Equation 1, "w" represents a degree of importance in the abnormal state information 31. Also in Equation 1, "i (i=1, 2, . . . )" represents a number given to an abnormal state (blowhole, poor fusion, poor merge, crack, . . . ). Also in Equation 1, "k (k=1, 2, . . . )" represents a voxel number. Also in Equation 1, "max| |" represents a function for acquiring the maximum value in "| |", and a subscript "t" of "max" indicates searching for the maximum value while changing the value of "t".

After all, the monitoring method determination unit 23 observes measurement values in a time-series manner, and acquires a maximum difference between an output of a corrective computation model (an abnormal value) and an output of a computation model (a normal value), for each abnormal state and for each voxel.

In step S209, the monitoring method determination unit 23 determines an optimum sensor placement. Specifically, the monitoring method determination unit 23 substitutes the candidate for the sensor placement and the difference calculated in step S208 into the right side of Equation 2 while changing the candidate, and determines a sensor placement S that maximizes the left side of Equation 2. Equation 2 is called an optimization function "F(S)".

[Mathematical Formula 2]

$$F(S) = \left| \sum_i \sum_{k \in S} D_{ik} - c(S) \right| \quad (2)$$

In Equation 2, "S" represents an individual candidate for the sensor placement. Also in Equation 2, "c" represents a function indicating a cost for achieving the sensor placement S. This function is prepared based on a cost in the sensor information 32 (FIG. 4) and a distance between two sensors. As to a distance between two sensors, the user sets the minimum value in order to prevent the distance too short. Also in Equation 2, "k∈ S" which means that k belongs to S is added below the right sum symbol "Σ", and "i" is added below the left sum symbol "Σ". That is, the first term in "| |" indicates a result of a sum of differences in voxels at positions where sensors measure measurement values for each abnormal state.

In step S210, the monitoring method determination unit 23 determines an abnormality index. Specifically, the monitoring method determination unit 23 calculates an abnormality index "$I_i(S)$" in a case where the optimization function is maximized, from Equation 3. The abnormality index indicates, for each abnormal state, a degree of an abnormality detectable by the sensor placement.

[Mathematical Formula 3]

$$I_i(S) = \sum_{k \in S} D_{ik} \quad (3)$$

In step S211, the monitoring method determination unit 23 displays the sensor placement and the abnormality index. Specifically, the monitoring method determination unit 23 causes the output device 13 to display a guidance screen 71 (FIG. 12).

Figure 12:
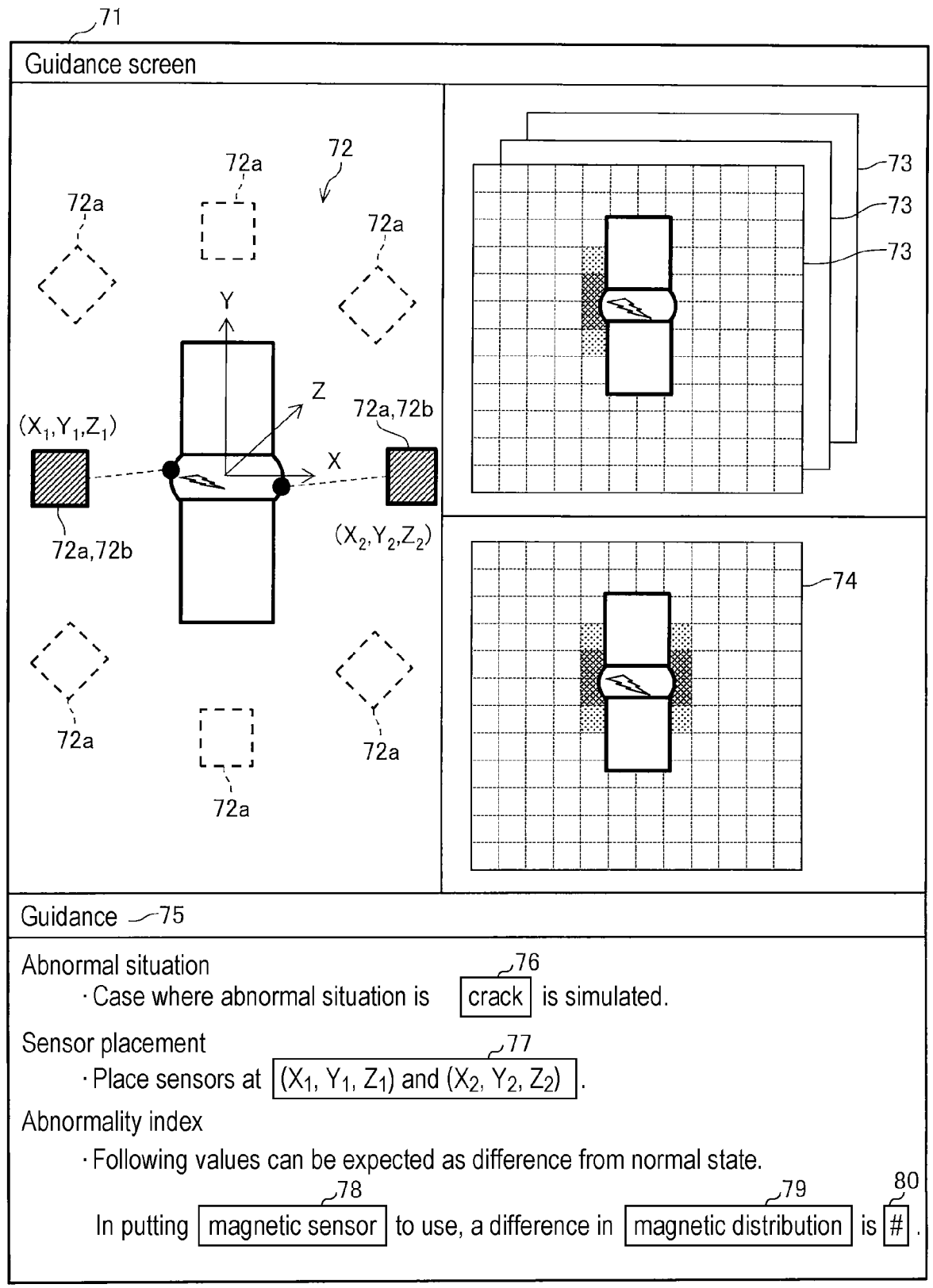
FIG. 12 illustrates an exemplary guidance screen.

FIG. 12 illustrates an exemplary guidance screen 71. The monitoring method determination unit 23 displays a placeable position 72a and a sensor placement 72b that maximizes the optimization function, on a recommended sensor placement field 72. The monitoring method determination unit 23 also displays a voxel image 73. FIG. 12 illustrates a two-dimensional image in view of illustrative circumstances. The monitoring method determination unit 23 may display a three-dimensional voxel image.

FIG. 12 illustrates three voxel images 73. The voxel images are acquired for each sensor position or for each sensor type in the simulation. In each voxel image, for example, voxels are colored for representing a degree of difference between measurement values in the simulation. The monitoring method determination unit 23 displays the three voxel images 73 in a switchable manner according to a user's operation.

The monitoring method determination unit 23 displays an integrated voxel image 74. The integrated voxel image 74 corresponds to the three voxel images 73 integrated into one (a union of superimposed voxel images). The integrated voxel image 74 indicates a difference that cannot be detected by sensors of the same type or a single sensor.

The monitoring method determination unit 23 displays a guidance field 75. The guidance field 75 initially displays an abnormal state (a field 76), a sensor placement (a field 77), a sensor type (a field 78), a measurement value type (a field 79), and a difference (a field 80). The initially displayed information maximizes the abnormality index (the difference).

It is assumed herein that the user touches the abnormal state field 76 with the input device 12 such as a mouse. The monitoring method determination unit 23 then changes the abnormal state as follows: "crack→blowhole→poor fusion-→poor merge→crack" in sequence, and displays information that maximizes the difference in the changed abnormal state, on the fields 77 to 80. It is assumed herein that the user then touches the sensor type field 78 with the input device 12 such as a mouse. The monitoring method determination unit 23 then changes the sensor type as follows: "magnetic sensor→strain gauge→ammeter→thermometer→magnetic sensor" in sequence, and displays information that maximizes the difference in the changed sensor type, on the fields 76, 77, 79, and 80.

In a case where the fields 76 to 79 are blank, the monitoring method determination unit 23 accepts entry of given data by the user to at least one of the fields 76 to 79. The monitoring method determination unit 23 then displays, using the input data as a query condition (a constraint), data that is different from the input data and maximizes the difference, on each field. The monitoring method determination unit 23 transmits to the control and storage device 5 (FIG. 1) the information displayed on the guidance field 75, the information being associated with the sort. This configuration thus improves, for example, abnormality detection accuracy in starting a next welding process for the sort in the welding site 4.

The processing procedure then ends.

(Advantageous Effects of the Present Embodiment)

The manufacturing monitoring assistance device according to the present embodiment produces the following advantageous effects.

(1) The manufacturing monitoring assistance device is capable of performing a simulation using a computation model faithful to a product form, thereby providing an appropriate method for monitoring manufacturing of a product.

(2) The manufacturing monitoring assistance device is capable of monitoring a welding process.

(3) The manufacturing monitoring assistance device is capable of creating a computation model faithful to a product form, using a camera.

(4) The manufacturing monitoring assistance device is capable of creating a computation model faithful to a product form, using an X-ray CT apparatus.

(5) The manufacturing monitoring assistance device is capable of accepting entries of abnormality samples by a user.

(6) The manufacturing monitoring assistance device is capable of accepting entries of a sensor type and the like by a user.

(7) The manufacturing monitoring assistance device is capable of displaying an optimum sensor placement and a degree of an abnormality detectable by the sensor placement.

(8) The manufacturing monitoring assistance device is capable of maintaining balance between a degree of a detectable abnormality and a cost.

The present invention is not limited to the foregoing embodiment, and involves various modifications. For example, the foregoing embodiment has been described in detail for easy understanding of the present invention, and is not necessarily limited to those having all the described configurations. In addition, a part of the configuration of a certain embodiment can be replaced with the configuration of another embodiment, and the configuration of another embodiment can be added to the configuration of a certain embodiment. A configuration of each embodiment may be partially added to, removed from, or replaced with another configuration of the embodiment.

The foregoing configurations, functions, processing units, processing means, and the like may be embodied with hardware in such a manner that they are partially or entirely designed with, for example, integrated circuits. The foregoing configurations, functions, and the like may alternatively be embodied with software in such a manner that a processor interprets and executes programs implementing the respective functions. Information including programs, tables, files, and the like implementing the respective functions may be recorded on a recording device such as a memory, a hard disk, or a solid state drive (SSD) or a recording medium such as an IC card, an SD card, or a DVD.

The control lines and information lines described herein are those required for explanation; therefore, all the control lines and information lines for a product are not necessarily described. In practice, it can be considered that almost all the configurations are interconnected.

REFERENCE SIGNS LIST 1 manufacturing monitoring assistance device
2 network
3a, 3b form measurement chamber
4 welding site
5 control and storage device
6 camera
7 finished product (product sample)
8a X-ray source
8b X-ray detector
9 turntable
11 central control device
12 input device
13 output device
14 main storage device
15 auxiliary storage device
16 communication device
21 model creation unit
22 simulation unit
23 monitoring method determination unit
31 abnormal state information
32 sensor information
33 abnormal state sensor output information
34 normal state sensor output information
44 inspection target product
45 sensor

The invention claimed is:

1. A manufacturing monitoring assistance device comprising:
a memory;
an input device;
an output device; and
a processor communicatively coupled to the memory, the input device, and the output device, wherein the processor is configured to:
create a computation model in a case where a product as a sample is normal, based on a three-dimensional form acquired from the product,
wherein the product comprises a plurality of members welded together;
create a corrective computation model in a case where the product is abnormal, by adding a sample of an abnormal portion in the product to the created computation model, and to perform a simulation on each of the computation model and the corrective computation model; and
determine a method for monitoring a manufacturing process for the product, based on an abnormality index being a difference between an output from a sensor as a result of the simulation performed on the computation model and an output from a sensor as a result of the simulation performed on the corrective computation model, and cause the output device to display the determined method and the abnormality index,
wherein the manufacturing process comprises a welding process, and
wherein the processor accepts entries, by user, of a state of an abnormality in the product, a position of the abnormality in the product, a condition of occurrence of the abnormality, and a degree of importance of the abnormality in association with a sort of the product, and regards the accepted state of the abnormality as the sample of the abnormal portion.

2. The manufacturing monitoring assistance device according to claim 1, wherein
the processor acquires a surface form of the product from one or more cameras, and creates the computation model, based on the acquired surface form.

3. The manufacturing monitoring assistance device according to claim 1, wherein
the processor acquires a density distribution of the product from an X-ray computed tomography apparatus, and creates the computation model, based on the acquired density distribution.

4. The manufacturing monitoring assistance device according to claim 1, wherein
the processor accepts entries, by the user, of measurement values by the sensors, placeable positions of the sensors, a number of the sensors used, and a cost in association with types of the sensors, and regards the accepted types of the sensors as candidates for the sensors in the simulations.

5. The manufacturing monitoring assistance device according to claim 4, wherein
the processor causes the output device to display a sensor placement as the determined method, and the abnormality index corresponding to the sensor placement.

6. The manufacturing monitoring assistance device according to claim 5, wherein
the processor determines the sensor placement that maximizes a difference obtained by subtracting the cost from the abnormality index.

7. A manufacturing monitoring assistance method implemented by a manufacturing monitoring assistance device including a memory, an input device, an output device, and a processor communicatively coupled to the memory, the input device, and the output device,
the manufacturing monitoring assistance method comprising:
causing the processor to create a computation model in a case where a product as a sample is normal, based on a three-dimensional form acquired from the product,
wherein the product comprises a plurality of members welded together;
causing the processor to create a corrective computation model in a case where the product is abnormal, by adding a sample of an abnormal portion in the product to the created computation model, and to perform a simulation on each of the computation model and the corrective computation model; and
causing the processor to determine a method for monitoring a manufacturing process for the product, based on an abnormality index being a difference between an output from a sensor as a result of the simulation performed on the computation model and an output from a sensor as a result of the simulation performed on the corrective computation model, and to cause the output device to display the determined method and the abnormality index,
wherein the manufacturing process comprises a welding process, and
wherein the processor accepts entries, by user, of a state of an abnormality in the product, a position of the abnormality in the product, a condition of occurrence of the abnormality, and a degree of importance of the abnormality in association with a sort of the product, and regards the accepted state of the abnormality as the sample of the abnormal portion.

8. A non-transitory computer-readable storage medium including a manufacturing monitoring assistance program stored therein,
the manufacturing monitoring assistance program, when executed by one or more processors included in a manufacturing monitoring assistance device, causing the one or more processors to:
execute processing of creating a computation model in a case where a product as a sample is normal, based on a three-dimensional form acquired from the product,
wherein the product comprises a plurality of members welded together;
execute processing of creating a corrective computation model in a case where the product is abnormal, by adding a sample of an abnormal portion in the product to the created computation model, and performing a simulation on each of the computation model and the corrective computation model; and
execute processing of determining a method for monitoring a manufacturing process for the product, based on an abnormality index being a difference between an output from a sensor as a result of the simulation performed on the computation model and an output from a sensor as a result of the simulation performed on the corrective computation model, and causing an output device to display the determined method and the abnormality index,
wherein the manufacturing process comprises a welding process, and
wherein the one or more processors accepts entries, by user, of a state of an abnormality in the product, a position of the abnormality in the product, a condition of occurrence of the abnormality, and a degree of importance of the abnormality in association with a sort of the product, and regards the accepted state of the abnormality as the sample of the abnormal portion.

* * * * *